Aug. 14, 1945. C. L. EKSERGIAN ET AL 2,382,553
BRAKE MECHANISM
Filed Oct. 2, 1943 2 Sheets-Sheet 1

INVENTORS
Carolus L. Eksergian
Paul W. Gaenssle
BY John P. Tarbox
ATTORNEY

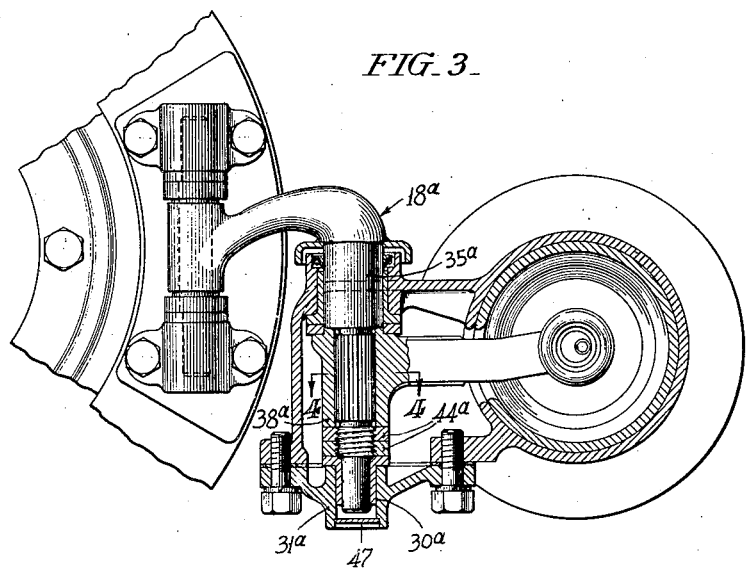
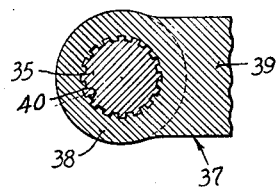

Patented Aug. 14, 1945

2,382,553

UNITED STATES PATENT OFFICE 2,382,553

BRAKE MECHANISM

Carolus L. Eksergian and Paul W. Gaenssle, Detroit, Mich., assignors to Budd Wheel Company, Philadelphia, Pa., a corporation of Pennsylvania Application October 2, 1943, Serial No. 504,684

5 Claims. (Cl. 188—205)

The invention relates to a brake mechanism and particularly to such a mechanism in which the non-rotating member or shoe of the brake and the actuating means therefor including an actuating lever are in large part housed in a sealed casing protecting them from water and dirt and forming part of the brake support.

It is among the objects of the invention to simplify such structures and to generally facilitate the manufacture and assembly of the parts thereof, particularly to facilitate the manufacture and assembly of the brake actuating lever and the mounting thereof in the casing so as to provide a sturdy and effective mounting and one which is readily sealed at the joint where the brake lever passes through the casing and wherever the casing body is provided with an opening for facilitating the assembly and disassembly of the lever parts.

Other and further objects and advantages and the manner in which they are attained will become apparent from the following detailed description when read in connection with the drawings forming a part of this specification.

In the drawings, the invention is illustrated as applied to a brake structure generally similar to that disclosed in co-pending application Serial No. 399,779 filed June 26, 1941, for Brake mechanism, although it will be understood that the main features thereof may be useful in other types of brakes and in other relations.

Fig. 3 is a view similar to Fig. 2 showing a slight modification, and

Fig. 4 is a detail sectional view taken substantially on the line 4—4 of Fig. 2 or 3.

Figures 1, 2:
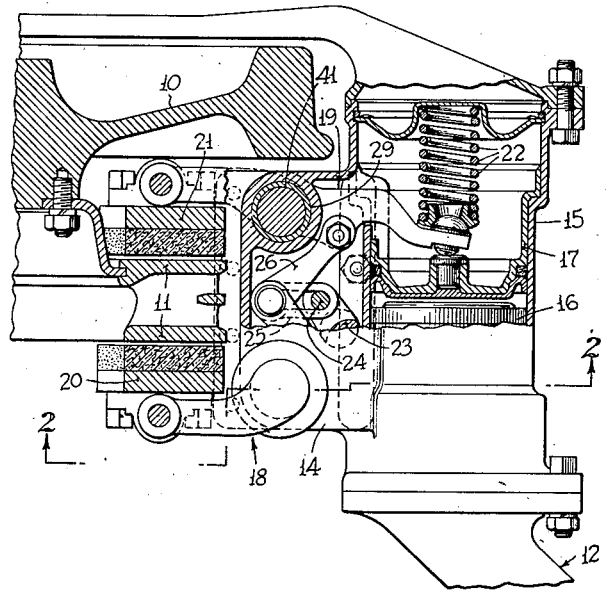
Fig. 1 is a fragmentary part-sectional and part-plan view of such a brake mechanism showing the invention applied thereto.
Fig. 2 is a vertical sectional view, the section being taken substantially on the line 2—2 of Fig. 1.

In the drawings, numeral 10 indicates a wheel of a railway truck to which is bolted the rotating brake member or ring 11. The brake support 12, which may comprise a generally U- or C-shaped support, is carried by a three point suspension, at two points from the ends of the axle carrying the wheels 10 and, at the third point from the truck transome, all as clearly shown and described in the above-referred to earlier application.

This brake support may comprise, as shown, a hollow casing, 14, widened in fore and aft direction in the region adjacent the brake ring 11. In this widened region the casing carries within it, in the region remote from the brake ring, the brake actuating cylinder 15 in which are slidingly mounted the opposed skirted pistons 16 and 17. These pistons cooperate respectively, with the ends of the brake-actuating levers, designated generally 18 and 19, which are pivotally mounted in the casing 14 in the region thereof adjacent the brake ring, and pivotally carry, respectively, the segmental brake shoes 20 and 21.

Springs, as 22, return the brake-actuating levers and shoes to inactive position, and compressed air admitted to the cylinder 15 between the pistons forces them apart to move the levers and brake shoes to operative braking engagement with the ring 11. Manually-operated means for actuating the shoes are represented by the vertical shaft 23 connected by a crank pin 24 and link 25 to the toggle arms 26 connected together and to the respective brake levers.

The parts so far described are generally similar in structure and operation to the brake mechanism disclosed in the earlier application above-referring to.

The modified construction of the present invention will now be described in detail.

As distinguished from the showing in co-pending application, Serial No. 504,683, filed of even date herewith, now Patent No. 2,374,853, dated May 1, 1945, the main body of the fore and aft widened portion of the casing 14 has but one of the vertically spaced walls 27 and 28 thereof pierced by a bearing opening. This bearing opening is widened to form an elongated full cylindrical bearing 29. The other bearing 30 in the opposed wall is carried by a removable cover portion 31 closing an opening in the main body of the casing. The casing 14 is sealed tightly about this opening by bolts, as 32, clamping the cover portion 31, at numerous spaced points in its margin, to a machined seat on the main body portion. A suitable sealing gasket as 33 may be clamped between the parts.

The lever as 18, is formed of two main parts, providing sturdiness of construction and facilitating assembly and disassembly. Its one part as 34, comprises a pivot portion, as 35 integral with an external arm 36 carrying the brake shoe 20. The other part 37 of the lever comprises a hub portion 38 fitting the pivot portion 35 with a sliding fit and having an arm 39 extending from the hub portion within the casing into cooperative abutting relation with the associated piston, as 16 of the actuating cylinder. The hub portion 38 of arm 39 is strongly connected to the pivot portion 35 by a splined connection 40, as clearly shown in Figs. 2 and 4, this connection being disposed between the bearings 29 and 30.

Since the part of the pivot portion 35 turning in the bearing 29 must carry heavy torque loads, the bearing and the part fitting it are made of generous diameter, substantially larger than the diameter of bearing 30 and the part of pivot portion 35 fitting it.

As the bearings must take radial and end thrusts from the lever, they are lined with wear-resisting bushings, adapted to take these thrusts without undue wear. The flanged bushing 41 in the bearing 29 is opposed by a flanged bushing 42 fitting into an annular recess in the hub portion 38 and seated against a shoulder 42' on the pivot portion 35.

The hub portion 38 is retained on the intermediate splined portion of the pivot portion 35 by a flanged bushing 43 fitting the reduced diameter end portion of the pivot portion 35 and the parts are clamped together against the shoulder 42' by a nut 44 threaded on the threaded end of portion 35. This end and the nut, which latter is locked by a lock washer 45, together with the cylindrical portion of the bushing 43 all pass through the bearing 30, also lined by a flanged hardened bearing bushing 46, when the removable cover is brought in place and clamped in position by the clamping bolts, as 32. The outer wall of the cover completely surrounds the end of the bearing 30 and parts associated with it, there avoiding all sealing problems at this bearing.

The other bearing 29, is sealed by an annular seal, as 47, seated in an annular recess formed by an annular projection 47' projecting beyond the bearing. Additional security is provided against the entrance of dirt or water by a frusto-conical shield 48' press fitted or otherwise secured to the outer end of the pivotal portion 35, the outer margin of said shield being downturned and telescoping loosely over the outer face of the annular projection 47'.

It will be noted that both the arm 36 carrying the shoe 20 and the arm 39 cooperating with the actuating piston, as 16, are bent to bring their end engaging portions substantially in line with the center of the bearing 29, thereby lessening the strain on this bearing due to the offset relation of the arms along the pivot portion and on opposite sides of the bearing.

From the foregoing description, it will be seen that a very simple and rugged construction has been provided, and one which permits the easy assembly of the actuating lever with the closed casing, and at the same time provides an effective seal for the casing against entrance of dirt and water.

In assembly the lever part 37 comprising hub 38 and arm 39 is first inserted into the casing with the arm 39 passing through the slots 48 and 49 provided in the cylinder wall and piston skirt respectively, see Fig. 2, into cooperative relation with the piston, as 16. The spring 22 would be held retracted in this operation by a suitable tool and allowed to engage the seat for it on the lever arm end after the lever arm had been moved into position. At the same time the toggle arm 26 of the manually operated device is secured to the lever arm 39. Now, with the hub portion 38 positioned under the bearing 29, the pivot portion 35 is lowered into the bearing 29 and the splined portion is slipped over the splined portion of the hub 38. Then the bearing bushing 43 is slipped over the reduced end of the pivot portion and the whole locked together by the lock nut 44 and lock washer 45. After this, the cover portion 31 carrying the bearing 30 is slid over the cylindrical portion of the bushing 43 and bolted in seated relation to the main body of the casing by the bolts 32. The disassembly would be equally simple, but with the operations carried out reversely.

In the modification shown in Fig. 3, the arrangement is substantially the same as in the preferred form, except that the hub 38ᵃ of the lever 18ᵃ directly abuts a shoulder formed by the enlarged upper portion of the pivot portion 35ᵃ and the lower bearing 30ᵃ is formed in the cover 31ᵃ outside the lock nuts as 44ᵃ which clamp the hub 38ᵃ against the shoulder and also serve to take the end thrust on the lower bearing 30. The manner in which the end thrust is transmitted to the upper bearing is substantially the same as in the preferred form. For ease of manufacture the bearing opening in the cover 31ᵃ may be drilled entirely through it and subsequently sealed on the outside by a closure plate 47 pressed fitted against a shoulder formed by an outer enlargement of the opening. The manner of assembly of this form is generally similar to the preferred form and further description thereof is deemed unnecessary.

While but one actuating lever has been described in detail it will be understood that both levers 18 and 19 associated with casing 15 adjacent the rotating brake ring 11 are similarly constructed and assembled with the casing. The opening in the bottom of the casing for ease of access to the interior of the main body thereof, preferably extends laterally a distance so as to include the lower bearings 30 associated with both levers 18 and 19.

While several preferred forms of the invention have been herein described in detail it will be understood that changes and modifications in detail, while still retaining the main features of the construction will readily occur to those skilled in this art, and such changes and modifications are intended to be included within the scope of the appended claims.

What is claimed is:

1. A brake mechanism comprising a support for a non-rotatable brake member including a closed casing, said casing having a fixed bearing in one of two spaced upper and lower walls thereof, and a removable wall portion carrying another bearing on the other of said spaced wall portions, a brake-actuating lever pivoted in said bearings, said lever comprising two separable parts, one an arm portion, and the other a pivot portion and an integral arm portion extending therefrom outside the casing for cooperation with an associated non-rotatable brake member, the first-named arm portion being non-rotatably secured to the pivot portion between the bearings and extending into the casing into position for actuation by actuating means housed within the casing.

2. A brake mechanism according to claim 1, in which the arm portion extending into the casing has a hub portion splined to the pivot portion and is locked thereon between a shoulder thereon and a nut screwed onto a threaded portion of said pivot portion.

3. A brake mechanism comprising a support for a brake shoe including a closed casing, said casing having aligned spaced bearings in opposite upper and lower walls thereof, one of said bearings being of larger diameter than the other, and a brake-actuating lever pivotally mounted in said bearings, said lever having offset arms extending from a pivotally portion thereof engaging said bearings, one arm extending from a position between the bearings into the casing for coaction with an actuator and the other arm extending from the outer end of said large diameter bearing for engagement with an associated brake shoe.

4. In a brake mechanism, a support including a closed casing, said casing having aligned spaced bearings in opposite walls thereof, an actuating lever having a pivot portion having spaced parts engaging said bearings and an intermediate part, an arm extending from said intermediate part for cooperation with an actuating means in the casing and an arm extending from the one end of said pivotal portion outside the casing for cooperation with a brake shoe, the ends of said arms remote from the pivotal portion of the lever being bent toward the bearing between them, so as to bring the points on the lever engaged by the actuating means and brake shoe and the bearing between the arms substantially into alignment.

5. In a brake mechanism, a support including a closed casing, said casing having a bearing in one of two spaced walls thereof, and a removable cover portion opposite said one of the spaced walls carrying a bearing in alignment with said first-named bearing, an actuating lever pivoted in said bearings, comprising an integral arm and a pivot portion, the latter having spaced parts thereof cooperating with said bearings, an arm non-rotatably secured to the pivot portion between said parts, one of said parts including, a bearing bushing for engagement with said second bearing, and means not exceeding the diameter of the bearing engaging portion of said bearing bushing for clamping the second arm and bearing bushing onto the pivot portion, and said removable cover portion when assembled with the main body of the casing wholly sealing said parts within the casing.

CAROLUS L. EKSERGIAN.
PAUL W. GAENSSLE.